(12) United States Patent
Jang et al.

(10) Patent No.: US 7,787,413 B2
(45) Date of Patent: Aug. 31, 2010

(54) METHOD FOR MOBILE STATION REQUEST RELEASE OF MULTIPLE PACKET DATA SERVICE SESSIONS SIMULTANEOUSLY USING RESOURCE RELEASE REQUEST MESSAGES

(75) Inventors: Ke-Chi Jang, Plano, TX (US);
Chung-Ching Wang, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1770 days.

(21) Appl. No.: 10/795,594

(22) Filed: Mar. 8, 2004

(65) Prior Publication Data

US 2004/0179490 A1 Sep. 16, 2004

Related U.S. Application Data

(60) Provisional application No. 60/454,830, filed on Mar. 14, 2003.

(51) Int. Cl.
*H04W 4/00* (2009.01)
(52) U.S. Cl. .................. 370/328; 370/337; 370/347; 370/369; 455/428; 455/445; 709/227
(58) Field of Classification Search .............. 370/312, 370/329, 328, 335, 352, 355, 343, 342, 350; 455/414.1, 518, 519, 537, 434, 520, 524
See application file for complete search history.

(56) References Cited

U.S. PATENT DOCUMENTS

| 6,654,360 | B1 * | 11/2003 | Abrol ..................... 370/329 |
| 6,882,632 | B1 * | 4/2005 | Koo et al. ................. 370/335 |
| 7,047,031 | B2 * | 5/2006 | Rosen et al. .............. 455/518 |
| 7,664,503 | B2 * | 2/2010 | Choi et al. ............... 455/445 |
| 2002/0077105 | A1 * | 6/2002 | Chang ..................... 455/436 |
| 2005/0165951 | A1 * | 7/2005 | Wang et al. ............... 709/237 |
| 2005/0181773 | A1 * | 8/2005 | Chang ................... 455/414.1 |

FOREIGN PATENT DOCUMENTS

| EP | 1079652 A1 | 2/2001 |
| WO | WO 00/35126 A1 | 6/2000 |
| WO | WO 01/52574 A1 | 7/2001 |

* cited by examiner

*Primary Examiner*—Nghi H Ly
*Assistant Examiner*—Inder P Mehra
(74) *Attorney, Agent, or Firm*—Carr LLP (57) ABSTRACT

An apparatus, a method, and a computer program are provided for increasing the efficiency of Radio Frequency (RF) resources. Specifically, a modified Resource Release Request Message (RRRM) is utilized. The modified RRRM incorporates several additional fields that allow for the release of multiple service instances at approximately the same time. The simultaneous or near simultaneous release of multiple service instance is more efficient that the traditional RRRM for the release of a single service instance. Therefore, limited RF resources can be better preserved.

17 Claims, 5 Drawing Sheets

200

| GATING DISCONNECT INDICATOR (1 BIT) 202 | CONNECTION REFERENCE (0 OR 8 BITS) 204 | PURGE SERVICE INDICATOR (0 OR 1 BIT) 206 | MAIN PACKET DATA SERVICE INSTANCE INDICATOR (0 OR 1 BIT) 208 | ADDITIONAL CONNECTION REFERENCE INCLUDED INDICATOR (0 OR 1 BIT) 210 | NUMBER OF ADDITIONAL CONNECTION REFERENCES (0 OR 5 BITS) 212 | ADDITIONAL CONNECTION REFERENCE (0 OR 8 BITS) 214 | ADDITIONAL PURGE SERVICE INSTANCE INDICATOR (0 OR 1 BIT) 216 |
|---|---|---|---|---|---|---|---|

*FIG. 1*

| GATING DISCONNECT INDICATOR (1 BIT) 202 | CONNECTION REFERENCE (0 OR 8 BITS) 204 | PURGE SERVICE INDICATOR (0 OR 1 BIT) 206 | MAIN PACKET DATA SERVICE INSTANCE INDICATOR (0 OR 1 BIT) 208 | ADDITIONAL CONNECTION REFERENCE INCLUDED INDICATOR (0 OR 1 BIT) 210 | NUMBER OF ADDITIONAL CONNECTION REFERENCES (0 OR 5 BITS) 212 |
|---|---|---|---|---|---|

| ADDITIONAL CONNECTION REFERENCE (0 OR 8 BITS) 214 | ADDITIONAL PURGE SERVICE INSTANCE INDICATOR (0 OR 1 BIT) 216 |
|---|---|

METHOD FOR MOBILE STATION REQUEST RELEASE OF MULTIPLE PACKET DATA SERVICE SESSIONS SIMULTANEOUSLY USING RESOURCE RELEASE REQUEST MESSAGES

CROSS-REFERENCE TO RELATED APPLICATIONS

This application claims priority from U.S. Provisional Patent Application entitled "METHOD FOR MOBILE STATION REQUEST RELEASE OF MULTIPLE PACKET DATA SERVICE SESSIONS SIMULTANEOUSLY USING RESOURCE RELEASE REQUEST MESSAGES" by Jang, et al., filed Mar. 14, 2003, Ser. No. 60/454,830 and is hereby incorporated by reference.

TECHNICAL FIELD

The present invention relates generally to packet data service instances for mobile units and, more particularly, to management of concurrent service features for mobile units.

BACKGROUND

Introduced in 1999, a new standard for data and voice telecommunications, known as Code-Division Multiple Access-2000 (CDMA2000), was adopted by the International Telecommunications Union (ITU). CDMA2000 is also known as the International Mobile Telecommunications (IMT) CDMA Multi-Carrier as well as 1× Radio Transmission Technology (1×RTT). Typically, CDMA2000 supports data transmission speeds between 144 Kilobits per second (Kbps) to 2 Megabits per second (Mbps).

As a result of the adoption of CDMA2000, mobile stations (MSs) utilize Resource Release Request Messages (RRRM) for service instances. Accordingly, an MS uses an RRRM to release a packet data service instance. However, the request does not release the traffic channel. Instead, when the traffic channel is released, a Release Order (RO) is utilized.

The RRRM comprises a plurality of fields that carry specific data components. One field within the RRRM is the PURGE_SERVICE field. When a packet data service instance is released, the MS can set the PERGE_SERVICE field to indicate a dormant state or a null state. The null state is a packet data service call control function where the packet data service is inactive, such as when the over-the-air traffic channel and the Point-to-Point Protocol (PPP) are released. The dormant state, though, is a packet data service function for a disconnect, such as when the over-the-air traffic channel is released, but the PPP session between the MS and the Packet Data Service Node (PDSN) remains intact.

Once the RRRM, has been transmitted, a Base Station (BS) can then send a Service Connect Message (SCM), a General Handoff Direction Message (GHDM), or a Universal Handoff Direction Message (UHDM). The SCM is request message for the connection of a service instance. The GHDM and the UHDM are handoff messages for handing off the MS to another BS, among some other functions. Specifically, the SCM/GHDM/UHDM are used to grant or deny the request from an MS.

However, with the increase in usage and usability of wireless services, subscribers often times have concurrent uses for a MS. For example, a wireless subscriber can be accessing a webpage while speaking to someone over a phone feature of a MS. During these instances of multiple usages, a user may want to release multiple packet data service instances. However, with the current technology, an MS would have to send multiple RRRMs to complete a session or task. As a result, the BS would be required to send multiple return messages, such as an SCM, in response to each RRRM sent.

The sending of multiple release messages, though, is a waste of resources. For each RRRM message and each SCM message sent, a small amount of bandwidth is required. Thus, channel resources are wasted. Moreover, processing is required by both the BS and the MS for each of the messages sent. Thus, processing and electrical power are wasted.

Therefore, there is a need for a method and/or apparatus for reducing the number of release messages sent for concurrent wireless applications that addresses at least some of the problems associated with conventional methods and/or apparatuses.

SUMMARY

The present invention provides a Resource Release Request Message (RRRM). In the RRRM, there is a main service indicator field. The main service indicator field corresponds to a packet data service instance that is the first in use. Also, there is a plurality of purge field indicators corresponding to pending release request. Each purge field indicator corresponds to a pending release request for a packet data service instance of the plurality of packet data service instances. Therefore, more than one indicator can be used so that multiple services can be terminated at substantially the same time.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
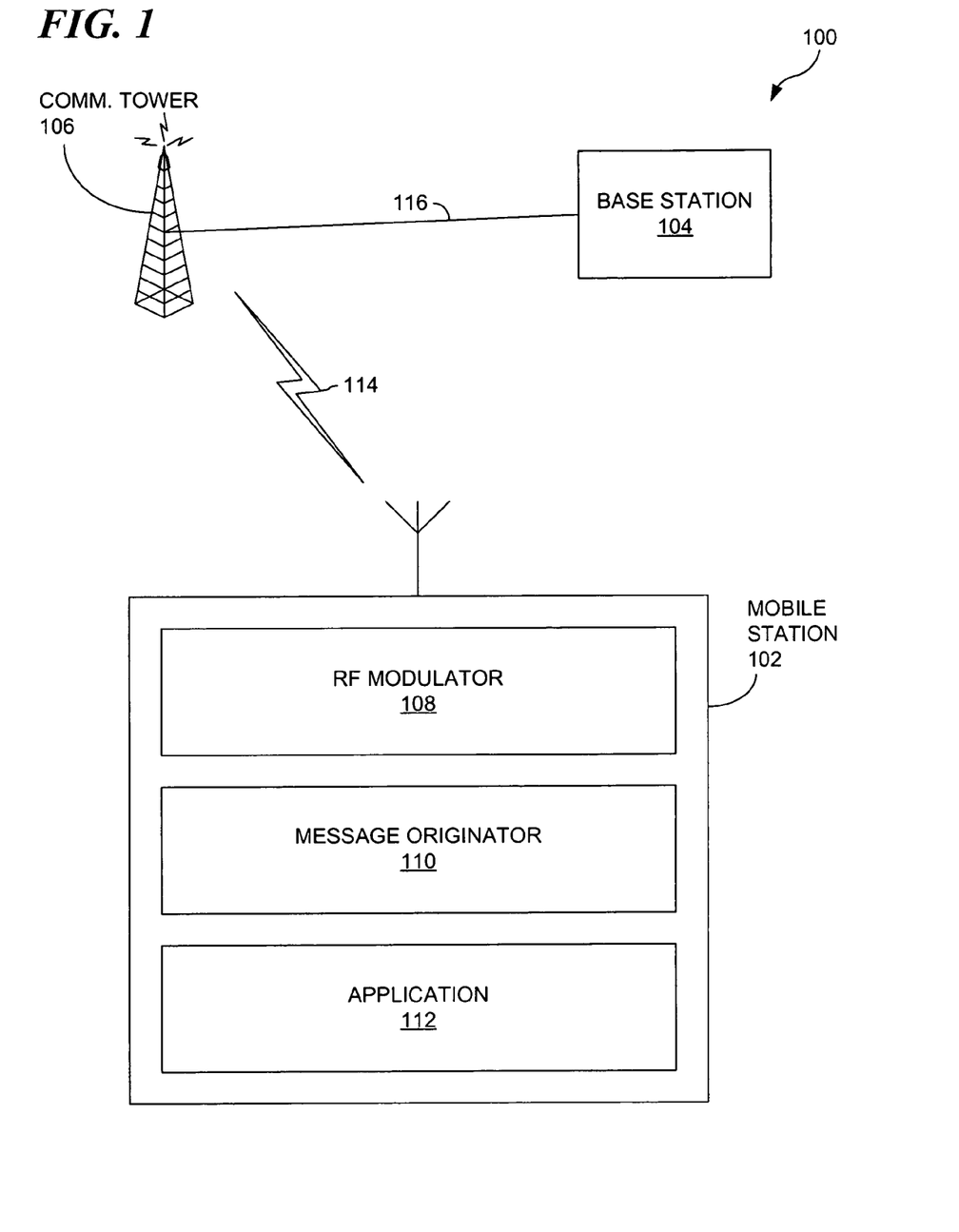
FIG. 1 is a block diagram of a communications network capable of supporting simultaneous release of multiple service instances.

Referring to FIG. 1 of the drawings, the reference numeral 100 generally designates a communications network capable of supporting simultaneous release of multiple service instances. The network 100 comprises an MS 102, a BS 104, and a communications tower 106.

The network 100, in a number of respects, functions as conventional communications networks. The BS 104 controls communications between the communications tower 106 and the MS 102 while providing application data to the MS 102. The BS 104 is coupled to the communications tower 106 through a first communication channel 116, and the communications tower 106 is coupled to the MS 102 through a second communications channel 114.

The MS 102 further comprises an application 112 and an RF modulator 108, similar to conventional MSs. However, the MS 102 also comprises a message originator 110. The message originator 110 is a component that provides improved communications with the BS 104 regarding data transmissions. Specifically, the message originator 110 enables the MS 102 to issue modified RRRM and RRRMM messages to more efficiently release packet data service instances.

Figure 2:
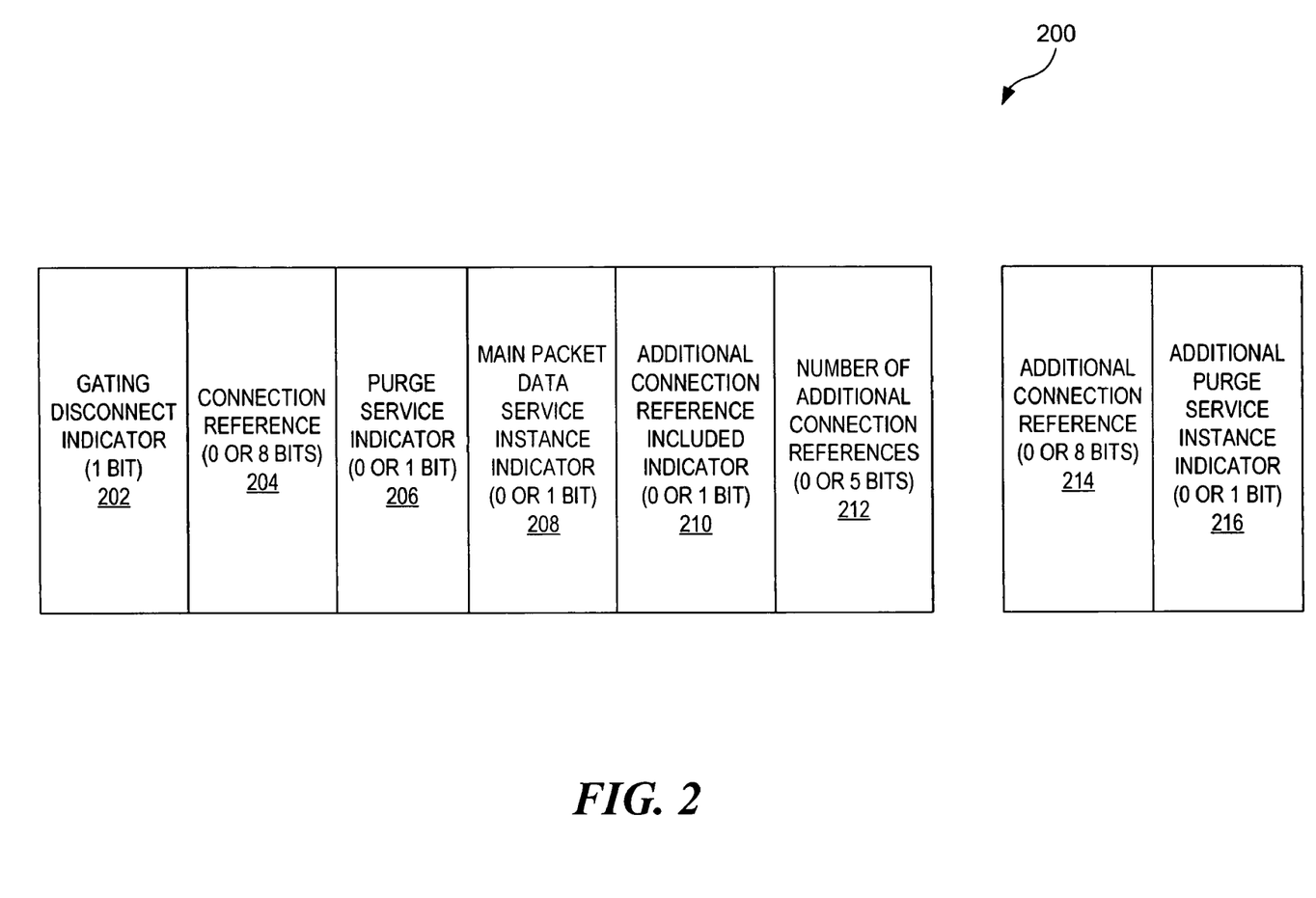
FIG. 2 is a block diagram depicting a modified RRRM.

Referring to FIG. 2 of the drawings, the reference numeral 200 generally designates a modified RRRM. An RRRM is transmitted from an MS to a BS. The RRRM comprises a request from the MS to release packet data service instances. However, conventional RRRM messages did not have the capability to differentiate among multiple services. The modified RRRM 200 presented herein, though, is expanded to have the capability to distinguish among multiple services.

The modified RRRM 200 comprises a plurality of transmitted bits, which are subdivided into a plurality of fields. The modified RRRM 200 comprises a Gating Disconnect Indicator field (GATING_DISC_IND) 202, a Connect Reference field (CON_REF) 204, a Purge Service Indicator field (PURGE_SERVICE) 206, a Main Packet Service Instance Indicator field (MAIN_SERVICE) 208, Additional Connection Reference Included Indicator field (ADD_CON_REF_INCL) 210, Number of Additional Connection References field (NUM_ADD_CON_REF) 212, an Additional Connection Reference field (ADD_CON_REF) 214, and an Additional Service Purge Instance Indicator field (ADD_PURGE_SERVICE) 216.

The first field in the modified RRRM 200 is the GATING_DISC_IND 202. The GATING_DISC_IND 202 is 1 bit long and is commonly referred to as a reverse pilot gating. The GATING_DISC_IND 202 indicates to the network that a disconnection is requested. If the MS requests that a reverse pilot gating operation be performed, the field is set to "1." Otherwise, the GATING_DISC_IND 202 is set to "0."

Operating in conjunction with the GATING_DISC_IND 202 is the CON_REF 204. Typically, if the GATING_DISC_IND 202 is set to "1" the MS is programmed to ignore the CON_REF 204. The CON_REF 204 is typically 0 or 8 bits long that indicates which service has a pending release request. However, if the GATING_DISC_IND 202 is set to "0," then the MS sets the CON_REF 204 to the connection reference corresponding to a service option that has been requested to be released. For example, a release request for a web-browsing service instance can be indicated. Also, if the requested release is the main data service option, the MS will set the CON_REF 204 to the main packet data service instance. For example, if the main data service instance is a phone call, then the CON_REF 204 will be set corresponding to the phone call.

Also, operating in conjunction with the GATING_DISC_IND 202 is the PURGE_SERVICE 206. The PURGE_SERVICE 206 is associated with a packet data service instance and indicates two states: null and dormant. Typically, the PURGE_SERVICE 206 is 0 or 1 bit long where a "1" indicates a null state and where a "0" indicates a dormant state. The null state is a packet data service call control function where the packet data service is inactive, such as when the over-the-air traffic channel and the PPP are released. The dormant state, though, is a packet data service function for a disconnect, such as when the over-the-air traffic channel is released, but the PPP session between the MS and the PDSN remains intact.

However, the operation of the PURGE_SERVICE 206 hinges on the indications of the GATEIN_DISC_IND 202. If the GATING_DISC_IND 202 is set to "1," the PURGE_SERVICE 206 is ignored. Although, if the GATING_DISC_IND 202 is set to "0," then the MS sets the PURGE_SERVICE 206 to "1" if the particular packet data service instance associated with the PURGE_SERVICE 206 is inactivated by CON_REF 204. If there is no identification of an inactivation, then the MS sets the PURGE_SERVICE 206 to "0."

As an example, a laptop and a cell phone can be used concurrently, where data is transmitted over a wireless network and through the cell phone to the computer. At the power-up stage, there is no PPP connection, and there is no Radio Frequency (RF) link. The initial state at power up is called a null state. Once the cell phone has been connected to the network and once data is actively being communicated, the cell phone/laptop are said to be in an active state. However, after an intermittent period where, for example, when a user is reading an email or webpage, there is no data transmission. During those intermittent periods, there is a PPP connection, but there is no RF link. Hence, the laptop/cell phone is in a dormant state during those intermittent periods.

Included with the fields associated with activation, there is also an indicator of the main packet data service instance. MAIN_SERVICE 208 is the field that identifies the main packet data service. For example, if a person is using a VOIP service for speaking on a phone and also using a web-browser, the main packet data service can be either the phone service or the web service. The main service associated with the MAIN_SERVICE 208 is the service that was initiated first in time.

One advantage of having MAIN_SERVICE 208 is that for the purpose of resource management. In many applications, an application can occupy several packet data service instance. Therefore, a main service associated with MAIN_SERVICE 208 may have associated ancillary service instances. Hence, when a main service is terminated, then all of the associated ancillary services can also be easily terminated.

Additionally, associated with the ancillary service instances is ADD_CON_REF_INCL 210. The ADD_CON_REF_INCL 210 is an indicator field that displays if there are additional connection references. If GATING_DISC_IND 202 is set to "1" or both the MAIN_SERVICE 208 and PURGE_SERVICE 206 are set to "1," then the MS omits this field. However, the ADD_CON_REF_INCL 210 is tied to the ADD_CON_REF 214 otherwise. The ADD_CON_REF 214 is associated with ancillary service where a release is requested. If an ADD_CON_REF 214 indicates that there is a pending release request for an ancillary service, then the ADD_CON_REF_INCL 210 is set to "1." Also, for each ancillary service with a pending release request, there is associated ADD_CON_REF 214. Otherwise, ADD_CON_REF_INCL 210 is set to "0." The purpose in utilizing ADD_CON_REF_INCL 210 is to identify if there are any ancillary services with pending release requests.

Further associated with the ADD_CON_REF_INCL 210 is the NUM_ADD_CON_REF 212. The NUM_ADD_CON_REF 212 indicates the number of ancillary services with pending release requests. If there are pending release requests for ancillary service instances, then the MS sets NUM_ADD_CON_REF 212 to one less than the total number of ADD_CON_REF 214 fields, wherein there is one ADD_CON_REF 214 associated with each pending release request for an ancillary service instance.

In addition to the ADD_CON_REF 214 for each ancillary service with a pending release request, there is an associated ADD_PURGE_SERVICE 218. The ADD_PURGE_SERVICE 218 indicates the state requested for the release request of the ancillary service instance. The ADD_PURGE_SERVICE 218 is set to "0" to request null state, and a "1" is for a requested dormant state.

Figure 3:
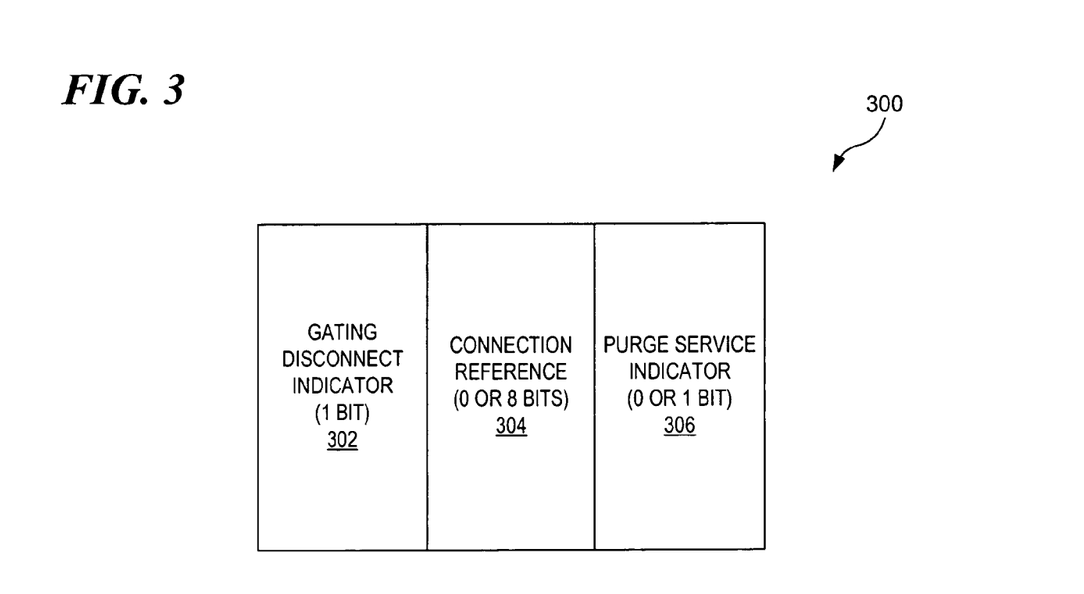
FIG. 3 is a block diagram depicting Resource Request Release Mini Message (RRRMM)

Referring to FIG. 3 of the drawings, the reference numeral 300 generally designates a RRRMM.

Effectively, the RRRMM 300 operates as a conventional RRRM message operates by requesting a release for a single service instance. The RRRMM 300 comprises a plurality of transmitted bits, which are subdivided into a plurality of fields. The RRRMM 300 comprises a Gating Disconnect Indicator field (GATING_DISC_IND) 302, a Connect Reference field (CON_REF) 304, and a Purge Service Indicator field (PURGE_SERVICE) 306.

The first field in the RRRMM is the GATING_DISC_IND 302. The GATING_DISC_IND 302 is 1 bit long and is commonly referred to as a reverse pilot gating. The GATING_DISC_IND 302 indicates to the network that a disconnection is requested. If the MS requests that a reverse pilot gating operation be performed, the field is set to "1." Otherwise, the GATING_DISC_IND 302 is set to "0."

Operating in conjunction with the GATING_DISC_IND 302 is the CON_REF 304. Typically, if the GATING_DISC_IND 302 is set to "1" the MS is programmed to ignore the CON_REF 304. The CON_REF 304 is typically 0 or 8 bits long that indicates which service has a pending release request. However, if the GATING_DISC_IND 302 is set to "0," then the MS sets the CON_REF 304 to the connection reference corresponding to a service option that has been requested release. For example, a release request for a web-browsing service instance can be indicated. Also, if the requested release is the main data service option, the MS will set the CON_REF 304 to the main packet data service instance. For example, if the main data service instance is a phone call, then the CON_REF 304 will be set corresponding to the phone call.

Also, operating in conjunction with the GATING_DISC_IND 302 is the PURGE_SERVICE 306. The PURGE_SERVICE 306 is associated with a packet data service instance and indicates two states: null and dormant. Typically, the PURGE_SERVICE 306 is 0 or 1 bit long where a "1" indicates a null state and where a "0" indicates a dormant state. The null state is a packet data service call control function where the packet data service is inactive, such as when the over-the-air traffic channel and the PPP are released. The dormant state, though, is a packet data service function for a disconnect, such as when the over-the-air traffic channel is released, but the PPP session between the MS and the PDSN remains intact.

However, the operation of the PURGE_SERVICE 306 hinges on the indications of the GATEIN_DISC_IND 302. If the GATING_DISC_IND 302 is set to "1," the PURGE_SERVICE 306 is ignored. Although, if the GATING_DISC_IND 302 is set to "0," then the MS sets the PURGE_SERVICE 306 is set to "1" if the particular packet data service instance associated with the PURGE_SERVICE 306 is inactivated by CON_REF 304. If there is no identification of an inactivation, then the MS sets the PURGE_SERVICE 306 to "0."

As an example, a laptop and a cell phone can be used concurrently, where data is transmitted over a wireless network and through the cell phone to the computer. At the power-up stage, there is no PPP connection, and there is no Radio Frequency (RF) link. The initial state at power up is called a null state. Once the cell phone has been connected to the network and once data is actively being communicated, the cell phone/laptop are said to be in an active state. However, after an intermittent period where, for example, when a user is reading an email or webpage, there is no data transmission. During those intermittent periods, there is a PPP connection, but there is no RF link. Hence, the laptop/cell phone is in a dormant state during those intermittent periods.

Figure 4:
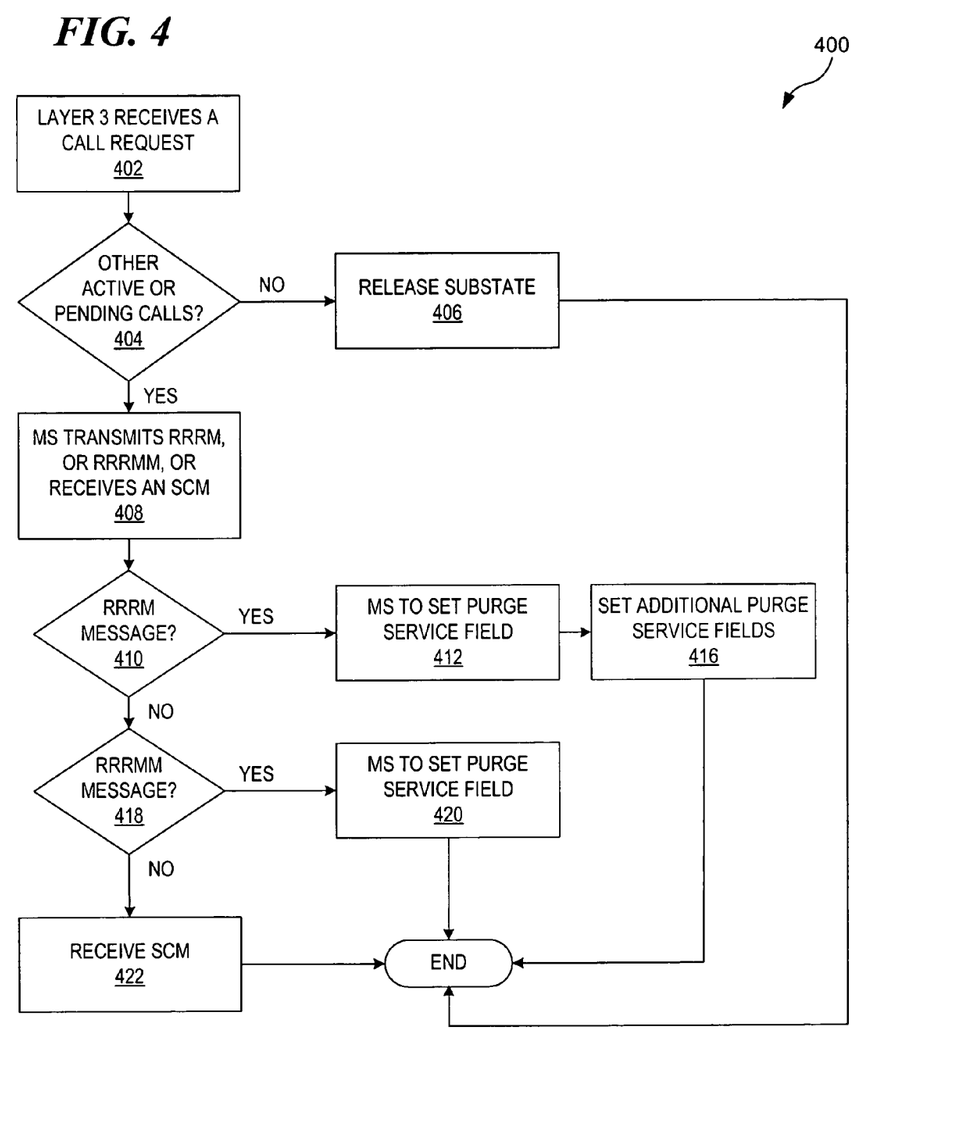
FIG. 4 is a flow chart depicting a call release request.

Referring to FIG. 4 of the drawings, the reference numeral 400 generally designates a flow chart depicting a call release request.

In order to allow current technology to support the use of multiple services, an MS can be enhanced to provide a sequence that utilizes a modified RRRM or an RRRMM. The RRRM and the RRRMM operate on Open Systems Interconnection (OSI) Layer 3. Specifically, OSI Layer 3 is the network layer. The network layer is the routing and the forwarding communication layer for packet data. Therefore, the sequence for utilizing the modified RRRM or the RRRMM begins by having Layer 3 of an MS receives a call release request in step 402.

Once the release request has been received, then a determination is made as to whether a pending or active call exists in step 404. The significance of determining if there are pending or active calls is that the MS is enabled with the capability of utilizing multiple features, such as VoIP, and distinguishing between features. By being able to distinguish between multiple features, the MS allows a user to optionally operate the various features available on the MS in any combination or at any time. For example, if a user is utilizing VOIP to speak on the phone while browsing the worldwide web, then the user can disconnect each feature independently in any sequence without affecting the performance of either service. However, if there are no pending or active calls, then the MS can enter a release substate in step 406. The release substate is an idle state for the MS, where the MS is essentially dormant. In contrast, when an MS is not in a release substate, the MS is in a traffic state where data can be actively transmitted.

If there is an active service or a pending service, though, then another sequence is employed. In step 408, the MS transmits an RRRM, or an RRRMM or receives an SCM. An RRRM is a modified message, such as the modified RRRM 200 of FIG. 2, that is utilized for the release or inactivation when multiple services are employed. An RRRMM message is also a modified message, such as the RRRMM 300 of FIG. 3, that is utilized for single service release requests without transmitting a complete RRRM 200 of FIG. 2. An SCM is connection message that requests service activation. The SCM can be used to release a service; however, use of an SCM for a service release is typically cumbersome.

If the MS transmits an RRRM, then an RRRM specific sequence is employed in step 410. The MS sets the Purge Service Indicator field of an RRRM, such as PURGE_SERVICE 206 of FIG. 2, to "0" in step 412. Also, an additional Purge Service Indicator fields, such as ADD_PURGE_SERVICE 216 of FIG. 2, are set to "0" by the MS in step 414. The additional Purge Service indicators are set to "0" for all call control instance that has sent a "call release request." For example, assume a person is speaking on the phone, browsing the web, and communicating over a paging network. If a call request release is issued for the paging and the phone call, the purge service indicator fields corresponding to each of the service instances is set to "0." By setting the respective purge service instance indicators to "0," the MS places the services in a dormant state.

If there is the transmittal of an RRRMM, then an RRRMM specific sequence is employed in step 418. The MS sets the Purge Service Indicator field of an RRRMM, such as PURGE_SERVICE 206 of FIG. 2, to "0" in step 420. By setting the respective purge service instance indicators to "0," the MS places the services in a dormant state, releasing the traffic channel but retaining the session. A difference between the RRRM and the RRRMM, though, is that only one purge service filed indicator is set to "0" because an RRRMM is utilized specifically for a single service release request.

If an SCM is received, as in step 422, instead, the MS and BS function differently. The MS transmits a connection signal to the BS. However, based on the connection data received, the BS can determine from missing connection data that a service instance is to be release. For example, if an MS is utilizing a service instance to browse the web, then an SCM is received for a phone call. Because there is no data on the status of the browser, the service instance corresponding to the browser is set to a dormant state.

Figure 5:
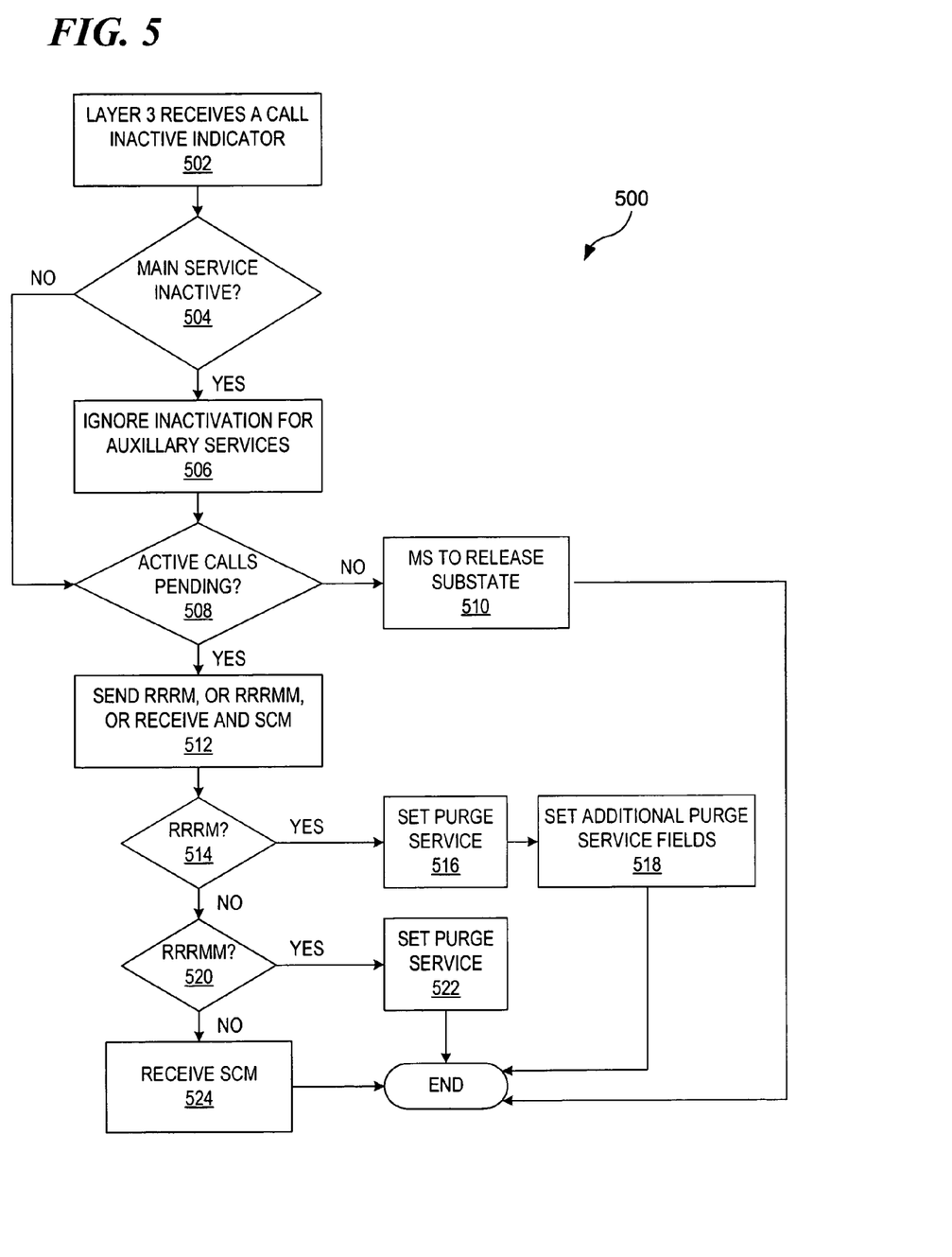
FIG. 5 is a flow chart depicting a call inactive indication.

Referring to FIG. 5 of the drawings, the reference numeral 500 generally designates a flow chart depicting a call inactive indication.

In order to allow current technology to support the use of multiple services, an MS can be enhanced to provide a sequence that utilizes a modified RRRM or an RRRMM. The RRRM and the RRRMM operate on OSI Layer 3. Specifically, OSI Layer 3 is the network layer. The network layer is the routing and the forwarding layer for packet data. Therefore, the sequence for utilizing the modified RRRM or the RRRMM begins by having Layer 3 of an MS receive a call inactive indicator in step 502.

Once a call inactive indicator has been received, a determination is made as to whether a call control instance corresponds to the main packet data service in step 504. If a call control instance does correspond to the main data service, then Layer 3 is to ignore the call inactive indications from any call control instance corresponding to auxiliary packet data services in step 506. Call inactive indications from any call control instance corresponding to auxiliary packet data services are ignored because an application can utilize several service instances simultaneously. Ignoring call control instances to auxiliary packet data services allows for proper usage of the service instances.

A determination is then made as to whether a pending or active call exists in step 508. The significance of determining if there are pending or active calls is that the MS is enabled with the capability of utilizing multiple features and distinguishing between features. By being able to distinguish between multiple features, the MS allows a user to optionally operate the various features available on the MS in any combination or at any time. For example, if a user is utilizing VoIP to speak on the phone while browsing the worldwide web, then the user can disconnect each feature independently in any sequence without affecting the performance of either service. However, if there are no pending or active calls, then the MS can enter a release substate in step 510. The release substate is an idle state for the MS, where the MS is essentially dormant. In contrast, when an MS is not in a release substate, the MS is in a traffic state where data can be actively transmitted.

If there is an active service or a pending service, though, then another sequence is employed. In step 512, the MS transmits an RRRM or an RRRMM or receives an SCM. An RRRM is a modified message, such as the modified RRRM 200 of FIG. 2, that is utilized for the release or inactivation when multiple services are employed. An RRRMM message is also a modified message, such as the RRRMM 300 of FIG. 3, that is utilized for a single service release request. An SCM is connection message that request service activation. The SCM can be used to release a service; however, use of an SCM for a service release is typically cumbersome.

If the MS transmits an RRRM, then an RRRM specific sequence is employed in step 514. The MS sets the Purge Service Indicator field of an RRRM, such as PURGE_SERVICE 206 of FIG. 2, to "1" in step 516. Also, an additional Purge Service Indicator fields, such as ADD_PURGE_SERVICE 216 of FIG. 2, are set to "1" by the MS in step 518. The additional Purge Service indicators are set to "1" for all call control instance that has sent a "call release request." For example, assume a person is speaking on the phone, browsing the web, and communicating over a paging network. If a call request release is issued for the paging and the phone call, the purge service indicator fields corresponding to each of the service instances is set to "1." By setting the respective purge service instance indicators to "1," the MS places the services in a null state, releasing the traffic channel and terminating the session.

If there is the transmittal of an RRRMM, then an RRRMM specific sequence is employed in step 520. The MS sets the Purge Service Indicator field of an RRRMM, such as PURGE_SERVICE 206 of FIG. 2, to "1" in step 522. By setting the respective purge service instance indicators to "1," the MS places the services in a dormant state, releasing the traffic channel but retaining the session. A difference between the RRRM and the RRRMM, though, is that only one purge service filed indicator is set to "1" because an RRRMM is utilized specifically for a single service release request.

If an SCM is received, as in step 524, instead, the MS and BS function differently. The MS transmits a connection signal to the BS. However, based on the connection data received, the BS can determine from missing connection data that a service instance is to be release. For example, if an MS is utilizing a service instance to browse the web, then an SCM is received for a phone call. Because there is no data on the status of the browser, the service instance corresponding to the browser is set to a dormant state.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for communicating a plurality of forms of data, comprising
   at least one base station,
      wherein the base station is at least configured to transmit and to receive data from a plurality of mobile stations, and
   wherein the base station is at least configured to receive a release message sent from a first mobile station for a substantially simultaneous releasing of multiple service instances, and
   wherein the release message for multiple data services further comprises
      a plurality of fields comprising a main service indicator field,
         wherein the main service indicator field at least corresponds to a packet data service instance of a plurality of packet data service instances that is the first in use.

2. The apparatus of claim 1, wherein the plurality of fields further comprises
   a plurality of purge field indicators,
      wherein each purge field indicators of the plurality of purge field indicators corresponds to a pending release request for a packet data service instance of the plurality of packet data service instances.

3. The apparatus of claim 2, wherein each purge field of the plurality of purge fields is at least configured to indicate a dormant state.

4. The apparatus of claim 2, wherein each purge field of the plurality of purge fields is at least configured to indicate a null state.

5. The apparatus of claim 2, wherein the plurality of fields further comprises a number of additional references field, wherein the number of additional references field indicates a number of ancillary packet data service instances.

6. The apparatus of claim 1, wherein the plurality of fields further comprises a number of additional references field, wherein the number of additional references field indicates a number of ancillary packet data service instances.

7. A method for call releasing to a dormant state for multiple packet data service instances, comprising:
   receiving a call release request by a Mobile Station (MS), wherein the call release request is issued for one or more service instances and establishes a request message type for releasing one or more service instances;
   if the request message type is a Resource Release Request Message (RRRM),
   setting at least one purge service field of a request message corresponding to the at least one packet data service instance to 0, if there is no identification of an inactivation of at least one service instance, and if an indicator field of the request message does not indicate to ignore the at least one purge service field;
   if the request type is a Resource Request Release Mini Message (RRRMM),
   setting a purge service field of the request message to 0, if there is no identification of an inactivation of at least one service instance, and if an indicator field of the request message does not indicate to ignore the at least one purge service field; and
   sending the request message by the MS, wherein the request message at least indicates an indicia of a call release.

8. A method for call releasing to a dormant state for multiple packet data service instances, comprising:
   receiving a call release request by a Mobile Station (MS), wherein the call release request is issued for one or more service instances;
   determining if a pending or active call exists on the MS;
   if a pending or active call exists on the MS, then
      sending a Resource Release Request Message (RRRM) from the MS, wherein the RRRM comprises an indicator field comprising either a 1 or a 0, and at least one purge service field that indicates a null state as a 1 or a dormant state as a 0 for the one or more service instances;
   wherein sending a RRRM by the MS comprises:
      if the indicator field is set to 1, then the MS ignores at least a first purge service field of a first service instance;
      if the indicator field is set to 0, then the MS sets the first purge service field of the first service instance to 1, if the first service instance is associated with a request for inactivation; and
      if the indicator field is set to 0, then the MS sets the first purge service field to 0, if there is no identification of an inactivation of the first service instance;
   sending the RRRM by the MS, wherein the RRRM at least indicates an indicia of a call release;
   and if there are no pending calls or active calls, then
   entering a release substate by the MS.

9. A method for call inactivation to a null state for at least one packet data service instance, comprising:
   receiving a call release request by a Mobile Station (MS), wherein the call release request is issued for one or more service instances and establishes a request message type for releasing one or more service instances;
   if the request message type is an Resource Release Request Message (RRRM), then
   and sending a Resource Release Request Message (RRRM) by the MS,
      wherein the RRRM at least indicates an indicia of a call release, and
      wherein the RRRM comprises an indicator field and at least one purge service field that indicates a null state or a dormant state for the one or more service instances,
      wherein the indicator field indicates whether to ignore the at least one purge service field.

10. The method of claim 9, wherein the method further comprises if the request type is a Resource Request Release Mini Message (RRRMM), setting a purge service field of the request message to 1.

11. The method of claim 9, wherein the method further comprises:
   determining if there are other active calls or pending calls; and
   if there are not other pending calls or active calls, then entering a release substate by the MS.

12. An apparatus for communicating a plurality of forms of data, comprising:
   at least one mobile station,
      wherein the mobile station is at least configured to utilize a plurality of packet data service instances, and
      wherein the mobile station is at least configured to transmit a release message for a substantially simultaneous releasing of multiple packet data service instances; and
   wherein the release message for multiple data services further comprises
      a plurality of fields, comprising
         a plurality of purge field indicators, wherein each purge field indicators of the plurality of purge field indicators corresponds to a pending release request for a packet data service instance of the plurality of packet data service instances; and one or more indicator fields,
wherein each indicator field indicates whether to ignore at least one of the plurality of purge field indicators to establish at least a null or dormant state of the packet data service instance of the plurality of packet data service instances.

13. The apparatus of claim 12, wherein the plurality of fields, further comprises a main service indicator field,
wherein the main service indicator field at least corresponds to a packet data service instance of a plurality of packet data service instances that is the first in use.

14. The apparatus of claim 13, wherein each purge field of the plurality of purge fields is at least configured to indicate a dormant state.

15. The apparatus of claim 13, wherein each purge field of the plurality of purge fields is at least configured to indicate a null state.

16. The apparatus of claim 13, wherein the plurality of fields further comprises a number of additional references field, wherein the number of additional references field indicates a number of ancillary packet data service instances.

17. The apparatus of claim 12, wherein the plurality of fields further comprises a number of additional references field, wherein the number of additional references field indicates a number of ancillary packet data service instances.

* * * * *